United States Patent [19]

Rhodes

[11] 4,243,454

[45] Jan. 6, 1981

[54] SOLAR HEATING PANEL FORMING APPARATUS AND METHOD

[75] Inventor: Richard O. Rhodes, San Francisco, Calif.

[73] Assignee: Fafco, Inc., Menlo Park, Calif.

[21] Appl. No.: 924,724

[22] Filed: Jul. 14, 1978

Related U.S. Application Data

[62] Division of Ser. No. 813,226, Jul. 5, 1977, abandoned.

[51] Int. Cl.$^3$ .............................................. B29C 19/00
[52] U.S. Cl. .................................... 156/162; 156/173; 156/174; 156/229; 156/244.13; 156/296; 156/433
[58] Field of Search ............... 156/162, 173, 174, 229, 156/244.13, 296, 433

[56] References Cited

U.S. PATENT DOCUMENTS

| | | | |
|---|---|---|---|
| 2,968,334 | 1/1961 | Pederson | 156/174 |
| 3,420,721 | 1/1968 | Bayless et al. | 156/162 |
| 3,558,411 | 1/1971 | Beelien | 156/174 |
| 3,721,599 | 3/1973 | Addis | 156/433 |

Primary Examiner—James J. Bell

[57] ABSTRACT

A supply of hollow plastic tubing is obtained from an extrusion and sizing apparatus, or from a supply of hollow tubing on a reel. The hollow tubing is provided at a predetermined speed to a tensioning device which imparts a tension in the hollow tubing and delivers it to a feeding point at one edge of the periphery of a rotating drum. The continuous hollow tubing is wound around the periphery of the drum at the one edge and it is forced axially on the periphery by a helical shoe overlying the periphery at the one edge. A bank of quartz lamps heats one side of the hollow plastic tubing just prior to reaching the feeding point, and another bank of quartz lamps heats the opposite side of the hollow plastic tubing at the one edge of the drum just after the tubing passes the shoe. The two heated surfaces are pressed together by the axial force exerted by the shoe, and are fused in side by side relation to form a cylinder having a wall consisting of spiral turns of the plastic tubing fused together.

5 Claims, 9 Drawing Figures

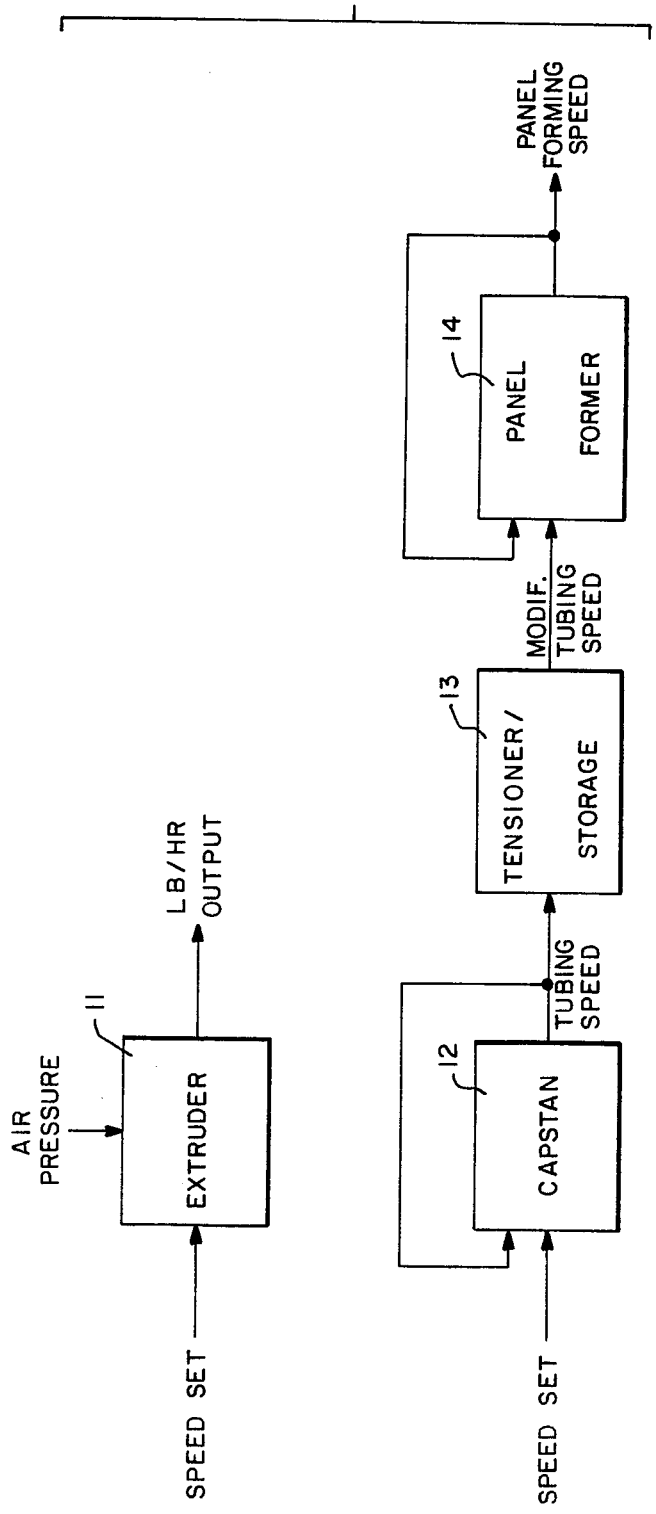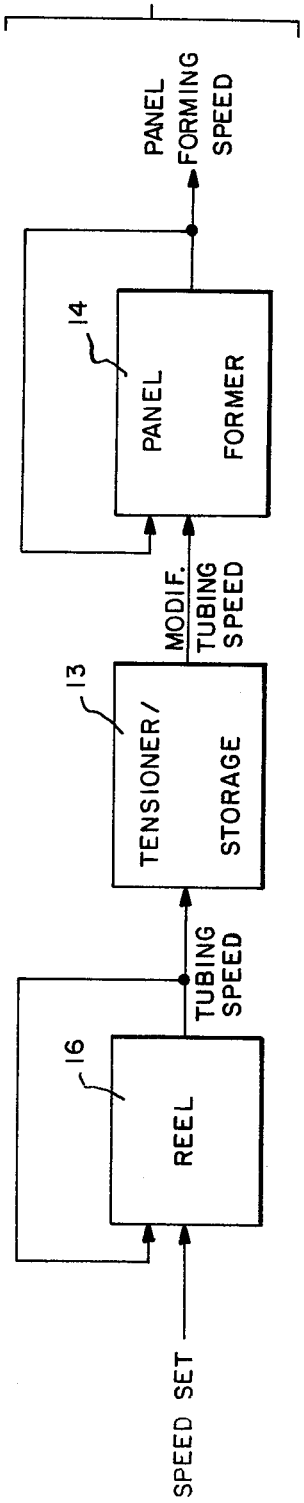

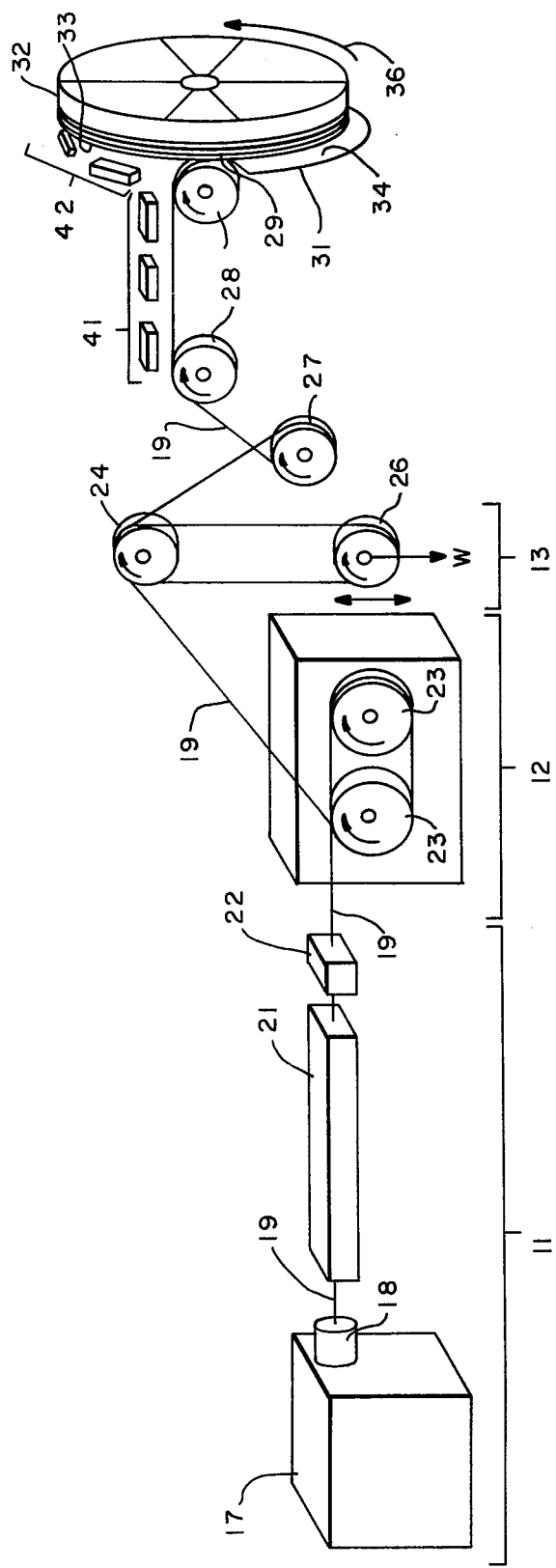
FIG.—3
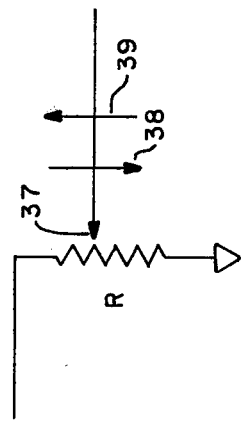
FIG.—4

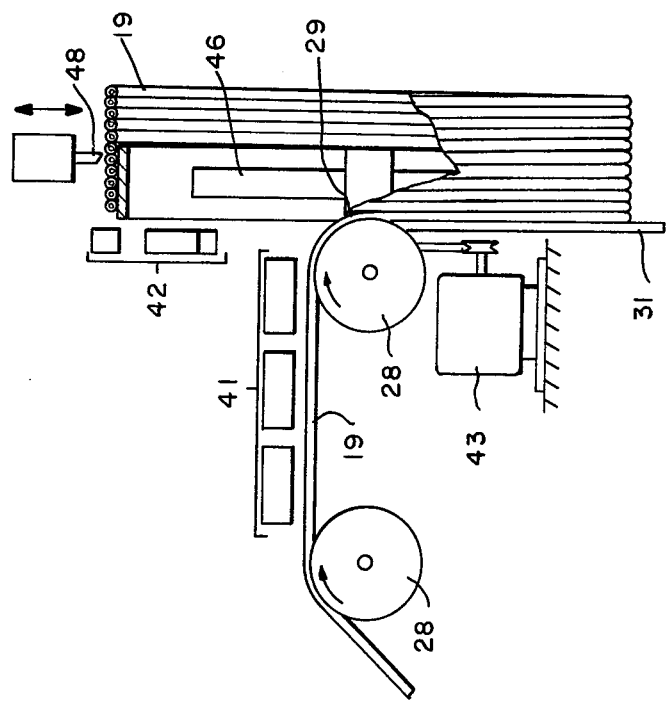
FIG.—6
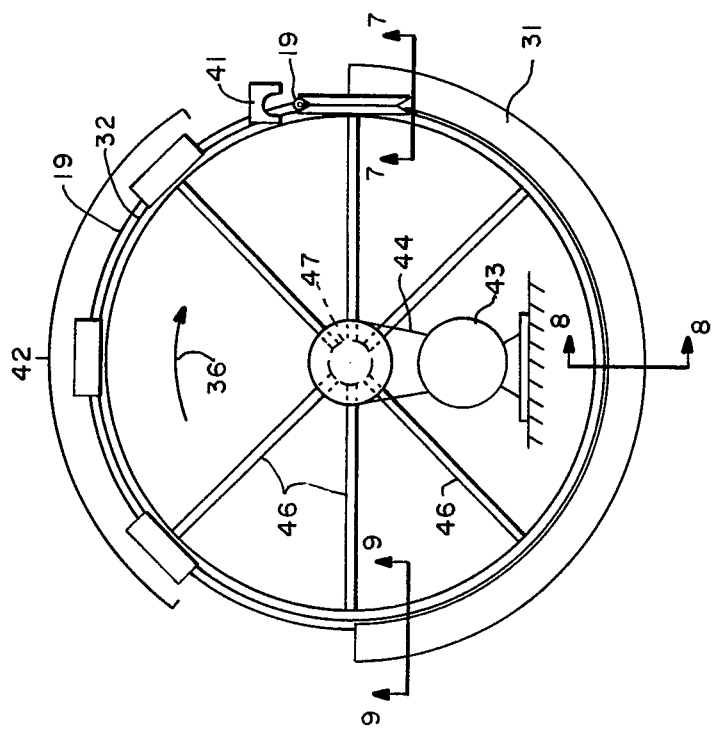
FIG.—5

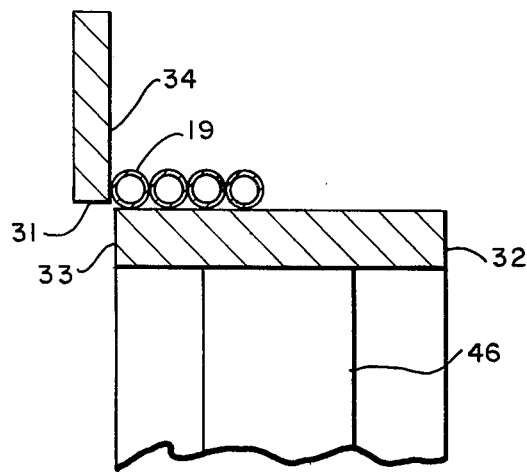
FIG.—7
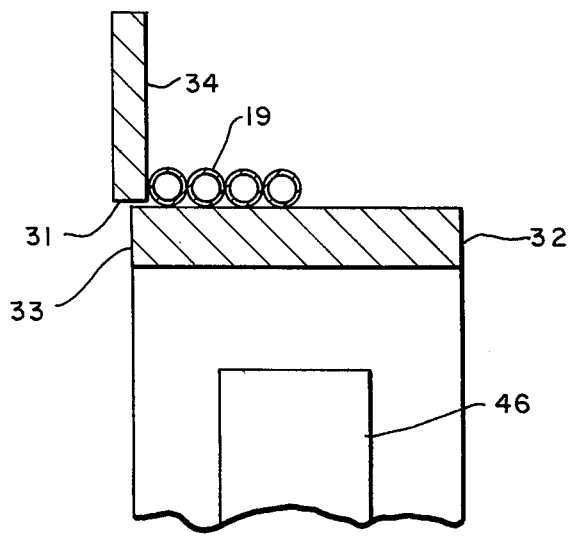
FIG.—8
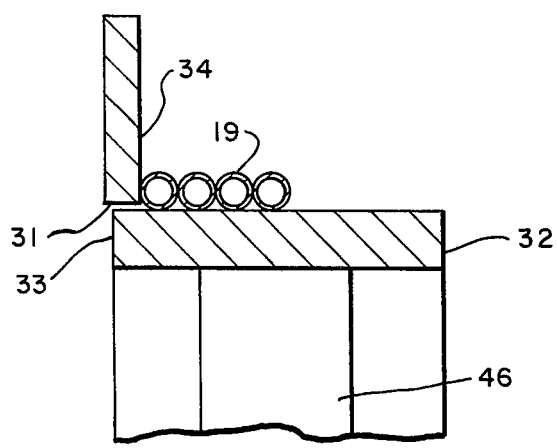
FIG.—9

SOLAR HEATING PANEL FORMING APPARATUS AND METHOD

This is a division of application Ser. No. 813,226 filed July 5, 1977, now abandoned.

BACKGROUND OF THE INVENTION

This invention relates to the formation of a solar heating panel and more particularly to apparatus and method which forms such a solar heating panel quickly and efficiently.

Apparatus is known for forming flat sheets from filament led onto the periphery of a rotating drum, in which adjacent turns of the wound filament thus formed is removed from the surface of the drum and cut in a direction parallel to the cylindrical axis, so that when the walls of the cylinder are thereafter laid flat, a flat sheet formed from the filament is obtained. Such a device is seen in U.S. Pat. No. 2,442,946.

A machine for fabricating a cylinder from a hollow filament is disclosed in U.S. Pat. No. 2,968,334, which has a short rotating drum onto which the hollow filament is wound. The tubing may be supplied by an extruding machine or from a reel containing such tubing. A stop member is located at one edge of the drum which contacts the hollow filament while it is being wound onto the drum. The stop member surface which contacts the filament rises along a helix axially of the drum. This forces the adjacent filament turns together and forces the cylinder which is formed off of the free end of the drum.

When a hollow tubing is wound on the periphery of a drum to form a cylinder having walls consisting of the spiral turns of the hollow tubing, the tubing has a tendency to twist as it is fed onto the periphery of the drum and to arbitrarily shift axially on the periphery of the drum as it is placed thereon. Moreover, a continuous length of hollow tubing provided at a predetermined speed presents difficulties in forming a cylinder on the periphery of the drum from a spiral of the hollow tubing with adjacent turns bonded together. The speed at which the drum is driven may be greater than the predetermined supply speed, which will cause the continuous length of hollow tubing to deform or break. The peripheral speed of the drum may be less than the hollow tubing supply speed, in which case the spiral turns are loose on the periphery of the drum, may actually overlap, and axial position thereon becomes difficult to control.

It is therefore desirable to obtain apparatus and method for forming a cylinder from a continuous length of hollow tubing supplied at a controlled tubing velocity, and disposed in a spiral with adjacent turns of the spiral being forced together with predetermined pressure, so that adjacent turns may be bonded securely together along the entire length of the tubing.

SUMMARY AND OBJECT OF THE INVENTION

The apparatus disclosed herein forms a cylindrical section from a continuous length of hollow tubing which is supplied and delivered at a predetermined speed to the periphery of a drum mounted for rotational movement. The tubing is led to a feed point on the periphery of the drum near one edge thereof. A driver is coupled to the drum to drive it rotationally at a speed corresponding to the speed of tubing delivery. A tension assembly receives the hollow tubing from the supply, imparting a substantially constant tension to the tubing, as it is delivered to the feed point. Structure is provided which bears against the tubing providing an axial force moving the hollow tubing axially on the periphery of the drum away from the one edge. A heater is mounted to fuse one side surface of the hollow tubing prior to delivery to the feed point. Another heater is mounted at the one edge of the drum to fuse the opposite side surface of the hollow tubing after the tubing has passed the structure for moving the tubing axially on the periphery of the drum. The two fused side surfaces are placed in positive contact at the feed point by the axial forces, and adjacent turns of tubing are fused together as they are wound on the periphery of the drum.

In general, it is an object of the present invention to provide apparatus for continuous fabrication of cylinders having hollow tubing walls which are formed rapidly and have consistent high quality.

Another object of the present invention is to provide cylinders having hollow tubing walls wherein there is minimal waste of the hollow tubing material.

Another object of the present invention is to provide apparatus and method for forming cylinders having hollow tubing walls in which the passages therethrough have minimal distortion and obstruction.

Another object of the present invention is to provide apparatus and method for forming cylinders having hollow tubing walls in which the twist in the tubing during formation is reduced.

Another object of the present invention is to provide apparatus and method for forming cylinders having hollow tubing walls using plastic raw material as the initial material.

Another object of the present invention is to provide apparatus and method for forming cylinders having hollow tubing walls in which the speed of tubing supply is tracked by the speed of formation of cylinders.

Another object of the present invention is to provide apparatus and method for forming cylinders having hollow tubing walls in which differentials between the speed of tubing supply and speed of cylinder formation are sensed, compensated, and controlled.

BRIEF DESCRIPTION OF THE DRAWINGS

FIG. 1 is a block diagram of one embodiment of the solar heating panel formation apparatus and method.

FIG. 2 is a block diagram of another embodiment of the solar heating panel formation apparatus and method.

FIG. 3 is a mechanical schematic diagram of the embodiment of FIG. 1.

FIG. 4 is an electrical schematic drawing of a circuit for modifying the tubing speed signal.

FIG. 5 is a rear elevational view of the drum receiving the continuous length of hollow tubing.

FIG. 6 is a cut-away side elevational view of the drum of FIG. 5.

FIG. 7 is a sectional view along the lines 6—6 of FIG. 6.

FIG. 8 is a sectional view along the lines 7—7 of FIG. 5.

FIG. 9 is a sectional view along the lines 8—8 of FIG. 5.

DESCRIPTION OF THE PREFERRED EMBODIMENTS

The embodiment of FIG. 1 shows an extruder 11 which receives plastic raw material and produces a hollow plastic tubing in a continous length. The speed at which the hollow plastic tubing is produced by the extruder 11 is set at a control point as shown. Extruder 11 also has an air pressure input as shown, which is adjustable, and which serves to provide an initial sizing of the hollow plastic tubing emitting from the extruder 11. Extruder output is relatively constant and is normally described in desired units, such as pounds per hour.

A capstan 12, or "puller," receives the hollow plastic tubing at the output velocity provided by extruder 11, and drives the tubing at a higher speed which is set in capstan 12 as shown. The output speed of the continuous length of hollow tubing from capstan 12 is monitored and fed back to be compared with the set speed therein, so that the capstan tubing output speed is controlled to the desired set speed. The differential in velocities of the continuous hollow tubing from extruder 11 and capstan 12 serves to pull, or draw the continuous length of hollow tubing to provide a final sizing operation thereon. The finally sized continuous length of tubing is delivered to a tensioner 13, which provides storage for lengths of the hollow tubing for a purpose to be hereinafter described. Tensioner 13 provides a modified tubing speed signal which is connected to a panel former 14, to control the speed of panel former 14 so that it is capable of accepting the continuous length of plastic tubing at the speed produced by capstan 12. Panel forming speed is monitored and fed back to a speed control on panel former 14 to be compared with the modified speed signal input from tensioner 13. In this fashion the speed of the panel former 14 is caused to track the tubing speed at the tensioner 13.

An alternate form of the panel forming apparatus includes a reel 16, seen in FIG. 2 of the drawings, which carries a supply of continuous hollow plastic tubing. Reel 16 is driven at a speed to provide a predetermined velocity in the continuous length of hollow plastic tubing to the tensioner 13. The predetermined feed speed from reel 16 is set at a control input, as shown, and is monitored and fed back to be compared with the set speed, to thereby control the feed from rell 16. The monitored feeding speed from reel 16 is also connected to tensioner 13, which serves to impart a tension in the continuous length of hollow plastic tubing and to store lengths thereof under conditions to be described. Tensioner 13 provides a modified tubing speed signal output as described above, which is connected to the speed control of panel former 14. Panel former 14 of FIG. 2 has the speed control features described above for FIG. 1.

Turning now to FIG. 3, extruder 11 is shown as one type of commercially available apparatus including a raw material receiving section 17 which heats the plastic raw material to a predetermined temperature and passes it to a die 18, which, in conjunction with an adjustable air pressure, provides a continuous length of hollow plastic tubing 19, which has an intially adjusted size. Hollow plastic tubing 19 is emitted from die 18 at a velocity which is set in the extruder as explained in conjunction with FIG. 1. The initially sized hollow plastic tubing 19 is led through a cooling trough 21, containing a cooling medium, such as water, to solidify the tubing and to bring the temperature of the initially sized plastic tubing 19 to a predetermined level. The cooled plastic tubing 19 is passed through an air wiper 22 which removes moisture from the surface thereof.

The dried, initially sized hollow plastic tubing 19 having a predetermined temperature, is led onto a set of pulley wheels 23 on the puller or capstan 12. Pulley wheels 23 are each driven rotationally in the same direction, as shown by the arrow in FIG. 3, at a rotational speed which provides a pulley peripheral velocity which is higher than the velocity from die 18 in extruder 11. As a consequence hollow plastic tubing 19 is drawn by capstan 12 to a final size, dependent upon the velocity differential, as well as extruder air pressure as mentioned above and delivered at the higher speed to tensioner 13.

Tensioner 13 imparts a tension in hollow plastic tubing 19 and allows tubing 19 to be placed positively in position on the periphery of drum 32 with negligible tendency to arbitrarily drift in position thereon. One embodiment of tensioner 13 includes a fixed position pulley assembly 24 having one or more pulleys for concentric rotation in the same direction as pulley wheels 23 on capstan 12. A movable pulley assembly 26 is provided having one or more pulley wheels thereon for concentric rotation. Hollow plastic tubing is wound around the pulley wheels in fixed pulley assembly 24 and movable pulley assembly 26 so that the pulley therein rotate in the same direction. Movable pulley assembly 26 is urged away from fixed pulley assembly 24 by an convenient means, such as a weight W attached to movable pulley assembly 26. Weight W imparts a predetermined tension in hollow plastic tubing 19, and further serves to both store and return lengths of hollow plastic tubing 19 when a speed differential exists in the velocity of hollow plastic tubing 19 upstream and downstream of tensioner 13.

A system of idler pulleys, represented by idler pulley 27, is provided downstream of tensioner 13, when necessary, to lead tensioned hollow plastic tubing 19 to a pair of feed pulleys 28. Feed pulleys 28 lead hollow plastic tubing 19, in tension, to a feed point 29. A stationary shoe 31 has one end proximate to feed point 29 to assist in leading hollow plastic tubing 19 onto the periphery of a winding drum 32 near one edge 33 thereof. Shoe 31 has a face 34 which overlies the periphery of winding drum 32 and extends through an arc rising on a helix axially of drum 32, and proximate to the periphery thereof. Face 34 has the helical shape advancing away from the one edge 33 in the direction of rotation shown by arrow 36. Winding drum 32 is driven at the rotational speed in the direction of arrow 36 such that the tangential velocity at the periphery thereof is approximately the same as the velocity of the hollow plastic tubing 19 as it is emitted from capstan 12. There are, of course, velocity transients in the velocity of hollow plastic tubing 19 from capstan 12, even though the output speed of hollow plastic tubing 19 therefrom is monitored and controlled as described above in the description of embodiment of FIG. 1. Velocity transients also occur at the periphery of winding drum 32, due to imperfections in the speed control of the driver for winding drum 32, load variations thereon, and during process startup. The output speed from capstan 12 is converted to a signal which is used to provide a reference for the control of the drive of winding drum 32. However, if winding drum 32 slows down relative to the output speed from capstan 12, a greater length of hollow plastic tubing 19 will be stored between the fixed and moving pulley assemblies 24 and 26 respectively in the tensioner 13, as weight W urges movable pulley assembly 26 away from fixed pulley assembly 24.

Circuitry is associated with tensioner 13 which is represented by the diagram of FIG. 4. The tubing speed signal for hollow plastic tubing 19 at the output of capstan 12 is connected to one end of a resistor R, in this embodiment, having the other end coupled to a reference signal level, such as ground potential. A moving contact 37 slides along resistance R to a position thereon corresponding to the position of movable pulley assembly 26 relative to fixed pulley assembly 24. A signal is therefore picked off of resistance R which is the modified tubing speed signal, and is indicative of the length of hollow plastic tubing 19 stored in tensioner 13. For example, when movable pulley assembly 26 is relatively close to fixed pulley assembly 24, and a smaller portion of hollow plastic tubing 19 is stored in tensioner 13, moving contact 37 in FIG. 4 will be moved toward the ground potential end of resistance R as shown by arrow 38, and a smaller or slowdown signal will be delivered to the driver for winding drum 32. Conversely, when a greater length of hollow plastic tubing 19 is stored between movable pulley assembly 26 and fixed pulley assembly 24, movable contact 37 will be elevated toward the high potential end of resistance R as shown by arrow 39, and the driver for winding drum 32 will accelerate, thereby delivering some of the stored length of hollow plastic tubing 19 to drum 32 and reducing the amount of tubing stored in tensioner 13. In this fashion, differentials in speed at the output of capstan 12 and the tangential speed at the periphery of winding drum 32 are absorbed in tensioner 13, and the average velocity at the periphery of winding drum 32 is caused to ultimately track the average output speed of the hollow plastic tubing 19 at capstan 12.

Hollow plastic tubing 19 is wound around idler pulley 27 and feed pulleys 28 such that the pulleys rotate in the same direction as pulley wheels 23, as well as the pulleys in fixed pulley assembly 24 and movable pulley assembly 26. A consistent direction of rotation about the guide and drive pulleys as hollow plastic tubing 19 is delivered to feed point 29 has been found to reduce twisting of the hollow plastic tubing as it is led onto the periphery of winding drum 32. The planes of rotation of feed pulleys 28 are nearly orthogonal to the plane of rotation of winding drum 32 in FIG. 3. This method of leading hollow plastic tubing 19 onto the periphery of winding drum 32 at feed point 29 has been found to further reduce the tendency in hollow plastic tubing 19 to twist. The fused surface of the passing tubing tends to migrate toward the plane of rotation of the feed pulleys 28. This method and apparatus fuses the tubing surface which is already in the plane of rotation of pulleys 28. Therefore, there is a further reduction in tendency for the tubing to twist by elimination of the tendency to migrate.

The importance of reduction of the tendency in tubing 19 to twist may be seen from the following. One surface of hollow plastic tubing 19 extending between the feed pulleys 28 is heated to a fusion point. A bank of quartz lamps 41 is used, in this embodiment, having elliptical reflectors operating to focus the heat energy from the lamps in a line along the one side of the length of plastic tubing 19. The continuous length of hollow plastic tubing 19 is therefore delivered to feed point 29 with the one fused surface uncontacted by feed pulleys 28 and facing in a direction which is opposite to the direction in which one edge 33 is facing. This orientation of the one fused surface is critical, and would be altered if tubing 19 is twisted.

Hollow plastic tubing 19 is urged in an axial direction on the periphery of winding drum 32 by face 34 of shoe 31 until it occupies a position displaced from the one edge 33 of winding drum 32 which is slightly less than the outside diameter of tubing 19. Shoe 31 extends only part way around the periphery of winding drum 32 as described hereinbefore. A heater is provided represented by an additional bank of quartz lamps 42 positioned adjacent to the one edge 33 of winding drum 32, and having elliptical reflectors which focus the heat energy therefrom against the opposite side of the last turn of hollow plastic tubing 19 after it has passed by face 34 on shoe 31, and prior to its reaching feed point 29. Consequently, the one side and the opposite side of the hollow plastic tubing 19 are fused and joined together at feed point 29 under the pressure provided by face 34 of shoe 31 as it forces the length of hollow plastic tubing 19 adjacent to edge 33 axially along the winding drum 32. The periphery of winding drum 32 may be roughened to afford resistance to the movement of the helical coil of hollow plastic tubing 19 wound thereon, so that a greater pressure exists between the fused surfaces at feed point 29, to thereby afford a better "weld joint" between adjacent turns in the helical coil of tubing 19.

Turning to FIG. 5, a drive motor 43 is shown coupled to the shaft of winding drum 32 through a drive belt 44. FIG. 5 is shown revealing the one face 33 on the periphery of winding drum 32. A number of spokes 46 are shown supporting winding drum 32 on a shaft 47 which is driven by belt 44 and drive motor 43. The stationary shoe 31 is shown extending through an arc about the periphery of winding drum 32 at one edge 33. A subsequent arc, in terms of the rotation of winddrum 32 shown by arrow 36, is occupied by the additional bank of quartz lamps 42 positioned proximate to one edge 33.

FIG. 6 shows hollow plastic tubing 19 being led over feed pulleys 28. As described above, this length of hollow plastic tubing 19 has one side surface exposed to heat energy focused thereon by elliptical reflectors associated with the bank of quartz lamps 41. The additional bank of quartz lamps 42 is shown proximate to one edge 33 of winding drum 32, which operate to fuse the opposite side surface of hollow plastic tubing 19 immediately prior to entering feed point 29 from the periphery of winding drum 32. A cylinder having hollow plastic tubing 19 as the cylinder wall is thereby formed as shown in FIG. 6. The cylinder of hollow plastic tubing 19 is moved off of the edge of winding drum 32 away from one edge 33 by the action of the shoe 31 having the helically formed face 34 thereon, which bears against the length of tubing 19 on drum 32 immediately after feed point 29.

The manner in which the helical face 34 of shoe 31 moves the cylinder formed from the spiral of hollow plastic tubing 19 axially on the periphery of winding drum 32 is shown in FIGS. 7 through 9. The sectional view of FIG. 7 is taken immediately after feed point 29 showing helical face 34 overlying the periphery of winding drum 32, substantially aligned with one edge 33. The section of FIG. 8 is taken 90 degrees subsequent in rotation around shoe 31, showing face 34 bearing against hollow plastic tubing 19 to force the spiral of plastic tubing 19 axially along the periphery of winding drum 32. The section of FIG. 9 is taken near the end of the arc traversed by shoe 31, showing face 34 bearing against the spiral of the hollowing plastic tubing 19, and moving the spiral axially along the periphery of winding drum 32 until it is displaced from one edge 33 slightly less than one diameter of plastic tubing 19. Face 34 bears against plastic tubing 19 which subsequently rotates past the additional bank of quartz lamps so that the side surface exposed thereto is fused, and thereafter rotated into feeding point 29 for fusion to the adjacent turn of hollow tubing 19 in the cylinder as described above. When the cylinder having the wall of hollow tubing 19 reaches a predetermined length extending from one edge 33, a cutting device such as knife 48 shown in FIG.6 is brought to bear against the cylinder to sever the predetermined length therefrom.

The method of forming cylindrical sections having walls formed of a continuous length of hollow plastic tubing 19 includes tensioning the continuous length of hollow tubing, and winding the tensioned hollow tubing in spiral fashion upon the periphery of the winding drum. Thereafter one side surface of the hollow tubing is heated to a fusion point just prior to being fed onto the periphery of the drum. The opposite side surface of the last turn of hollow tubing wound on the drum is then heated to a fusion point. The two fused surfaces on the adjacent turns of hollow tubing in the spiral of hollow tubing are forced together by an axial force parallel to the drum surface, so that adjacent turns in the spiral are welded together. The spiral of hollow tubing forms a cylinder having hollow tubing walls, and is cut at the periphery of the drum when the cylinder reaches a predetermined length.

The method further includes the step of storing lengths of the hollow tubing when the speed at which the hollow tubing is provided exceeds the speed of winding the hollow tubing on the winding drum. Thereafter the stored lengths of the hollow tubing are delivered to the winding drum when the peripheral speed of the drum exceeds the delivery speed of the hollow tubing. The amount of hollow tubing stored is measured, and the speed of the winding drum is controlled in accordance with the stored tubing measurement. As a consequence the average peripheral speed of the drum tracks the average delivery speed of the hollow tubing.

The hollow tubing may be delivered at a predetermined speed from a reel containing a continuous length of hollow tubing or may be provided by extruding the hollow tubing a predetermined speed. The extruded hollow tubing is drawn at a predetermined speed which serves to provide a final forming step for the hollow tubing. The higher predetermined speed is the nominal speed at which the hollow tubing is fed to the winding drum. The hollow tubing is led in the same direction about all the driving and leading pulleys which direct the tubing to the winding drum periphery, so that the tendency in the tubing to twist and move the fused surfaces angularly prior to joining is reduced. Moreover, the tubing is led onto the periphery of the winding drum from a direction which is approximately orthogonal to the rotational plane of the winding drum, further reducing the tendency for the hollow tubing to twist as it is led onto the winding drum periphery. The fused surfaces are local and restricted in surface area and depth, so that distortion of the tubing is minimized. The spiral of hollow tubing formed on the periphery of the winding drum is forced to move axially thereon, and resistance to the axial force is provided so that adequate pressure exists between adjacent turns of hollow tubing in the spiral to afford a firm weld joint between the fused surfaces.

A method and apparatus for forming a cylinder having walls of a continuous length of hollow plastic tubing has been disclosed, which is quick in the formation of the cylinders and efficient in the use of tubing material. The localized fusion of limited surfaces on the tubing allows the tubing strength to be maintained and distortion from bonding pressure to be minimized. The tension imparted into the tubing causes the spiral of tubing formed on the periphery of the winding drum to resist the axial force moving the spiral on the winding drum to increase the bonding pressure between adjacent turns of tubing to an acceptable level.

While the foregoing embodiments have been described in terms of winding drum peripheral speed control related to a tube delivery velocity, as from capstan 12, the panel former can alternately be controlled by reference to the amount of plastic tubing stored in tensioner 13.

What is claimed is:

1. The method of forming cylindrical sections having walls formed of a continuous length of hollow tubing, comprising the steps of extruding the hollow tubing at a first predetermined speed, drawing the extruded hollow tubing at a second predetermined speed, said second speed being greater than said first speed by a predetermined speed differential, whereby the hollow tubing is sized, tensioning the continuous length of hollow tubing,
   rotating a drum,
   feeding the tensioned hollow tubing to said drum so that it winds in spiral fashion on the drum,
   heating one side surface only of the hollow tubing to bring the outer surface to a fusion point immediately prior to reaching the drum,
   heating the opposite side surface only of the last wound turn of tubing in the spiral to bring the outer surface to a fusion point,
   forcing the spiral of hollow tubing axially on the drum surface so that as it is wound onto the drum the fused outer surfaces of adjacent turns are forced into contact, whereby adjacent turns in the spiral are fused together,
   and cutting the hollow tubing at the periphery of the drum when the fused spiral reaches a predetermined width.

2. The method of claim 1 wherein the hollow tubing is provided at a predetermined speed, together with the steps of
   storing lengths of the hollow tubing when the speed of winding is less than the predetermined speed,
   and delivering stored lengths of the hollow tubing to be wound when the speed of winding is more than the predetermined speed.

3. The method of claim 2 together with the step of measuring the length of hollow tubing stored,
   and controlling the speed of the drum in accordance with the measurement, whereby the peripheral speed of the drum tracks the predetermined speed.

4. The method of claim 1 together with the step of leading the hollow tubing to the drum in the same direction around a plurality of pulleys, so that twist in the hollow tubing is reduced.

5. The method of claim 1 wherein the step of winding includes the step of leading the hollow tubing onto the drum from a direction parallel to the cylindrical axis of the drum, so that twist in the hollow tubing is reduced.

* * * * *